United States Patent
Kovach et al.

(10) Patent No.: US 9,488,173 B2
(45) Date of Patent: *Nov. 8, 2016

(54) GEAR PUMP DRIVE GEAR STATIONARY BEARING

(71) Applicant: Hamilton Sundstrand Corporation, Charlotte, NC (US)

(72) Inventors: Brandon T. Kovach, Rockford, IL (US); Steven A. Heitz, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/448,552

(22) Filed: Jul. 31, 2014

(65) Prior Publication Data

US 2016/0032922 A1     Feb. 4, 2016

(51) Int. Cl.
| | | |
|---|---|---|
| *F04C 2/12* | (2006.01) | |
| *F04C 18/14* | (2006.01) | |
| *F04C 29/00* | (2006.01) | |
| *F04C 15/00* | (2006.01) | |

(Continued)

(52) U.S. Cl.
CPC ............... *F04C 2/14* (2013.01); *F01C 21/02* (2013.01); *F04C 2/12* (2013.01); *F04C 15/0061* (2013.01); *F04C 18/14* (2013.01); *F04C 29/005* (2013.01); *F04C 2240/54* (2013.01)

(58) Field of Classification Search
CPC .... F01C 21/02; F04C 15/0061; F04C 18/14; F04C 2/12; F04C 2/14; F04C 29/005; F04C 2240/54
USPC .................. 418/73, 75, 79, 80, 102
See application file for complete search history.

(56) References Cited

U.S. PATENT DOCUMENTS 2,479,077 A    8/1949   McAlvay
2,728,301 A *  12/1955  Lindberg ............ F04C 15/0026
                                               418/135
2,775,209 A *  12/1956  Albright ............. F04C 15/0088
                                               418/102

(Continued)

FOREIGN PATENT DOCUMENTS

EP    0310292 A2    4/1989
EP    1890045 A1    2/2008

(Continued)

OTHER PUBLICATIONS

European Search Report for European Application No. 15178793.4, dated Dec. 9, 2015, 10 pages.

(Continued)

*Primary Examiner* — Mary A Davis
*Assistant Examiner* — Dapinder Singh
(74) *Attorney, Agent, or Firm* — Kinney & Lange, P.A.

(57) ABSTRACT

One embodiment includes a gear pump with a drive gear, a gear shaft passing through the drive gear, and a stationary journal bearing. Also included is a fluid film location annularly between a surface of the stationary journal bearing and a surface of the gear shaft, and a hybrid pad location on the stationary journal bearing adjacent the fluid film location. The hybrid pad has a minimum leading edge angular location on the stationary journal bearing of 31.0° and a maximum trailing edge angular location on the stationary journal bearing of 43.0°. The gear pump also includes a porting path for supplying high pressure fluid from a discharge of the gear pump to the fluid film at the hybrid pad.

13 Claims, 5 Drawing Sheets

(51) Int. Cl.
*F01C 21/02* (2006.01)
*F04C 2/14* (2006.01)

(56) References Cited

U.S. PATENT DOCUMENTS

| | | | | |
|---|---|---|---|---|
| 2,823,616 A | * | 2/1958 | Toyoda | F04C 2/086 418/79 |
| 2,891,483 A | * | 6/1959 | Murray | F01C 21/02 384/291 |
| 3,528,756 A | | 9/1970 | Norlin et al. | |
| 4,289,460 A | | 9/1981 | Noell et al. | |
| 2015/0354559 A1 | * | 12/2015 | Kovach | F04C 2/18 418/1 |
| 2015/0354560 A1 | * | 12/2015 | Kovach | F04C 2/084 418/1 |
| 2015/0354561 A1 | * | 12/2015 | Kovach | F04C 2/084 418/1 |
| 2015/0354562 A1 | * | 12/2015 | Kovach | F04C 15/0042 418/1 |
| 2016/0032969 A1 | | 2/2016 | Kovach et al. | |

FOREIGN PATENT DOCUMENTS

| | | |
|---|---|---|
| EP | 2672119 A1 | 12/2013 |
| EP | 2 700 831 A1 | 2/2014 |
| EP | 2980353 A1 | 7/2015 |
| GB | 883356 | 11/1961 |

OTHER PUBLICATIONS

Combined Search and Examination Report, for British Patent Application No. GB1519403.8, dated May 13, 2016, 8 pages.

* cited by examiner

GEAR PUMP DRIVE GEAR STATIONARY BEARING

BACKGROUND

The present embodiments relate generally to gear pumps and, more particularly, to a stationary journal bearing of a gear pump.

A gear pump operates to pump fluid from an inlet to an outlet. Generally, a gear pump utilizes multiple gears, including a drive gear and a driven gear, each with respective teeth. The drive gear is rotated, and in turn rotates the driven gear at a location where the respective teeth mesh. Fluid enters the inlet and travels between the teeth of the drive gear and a housing, and the teeth of the driven gear and the housing. As the gears turn, the fluid is pulled towards the outlet and squeezed out of the gear pump due to a pressure differential between the inlet and outlet.

Both the drive gear and the driven gear are supported within the gear pump by respective gear shafts. Each gear shaft is in turn supported by both a pressure loaded journal bearing and a stationary journal bearing, both of which react the load of the gear shaft. The gear shaft load is carried by both the stationary and pressure loaded journal bearings through a fluid film pressure in each journal bearing, between a surface of the gear shaft and a surface of the journal bearing. Bearings such as these, which support their loads on a layer of liquid, are known as hydrodynamic bearings. Pressure develops in the fluid film as a result of a velocity gradient between the rotating surface of the gear shaft and the surface of the journal bearing (i.e., a viscosity of the fluid resists a shearing action of the velocity gradient).

A conventional hydrodynamic bearing will operate at a fluid film thickness at which the film pressure in the journal bearing reacts the loads applied to the gear and gear shaft. However, for a given operating condition, as the loads continue to increase the fluid film thickness will continue to reduce until the surfaces of the gear shaft and the journal bearing physically contact one another. This is referred to as a "bearing touchdown," and can cause damage, decreased performance, or catastrophic failure of the gear pump.

One solution for increasing the load carrying capacity of a given hydrodynamic journal bearing is to increase a size of the journal bearing. However, in certain gear pump applications operating and/or weight requirements do not permit the use of a larger and/or heavier journal bearing.

SUMMARY

One embodiment includes a gear pump with a drive gear, a gear shaft passing through the drive gear, and a stationary journal bearing. Also included is a fluid film location annularly between a surface of the stationary journal bearing and a surface of the gear shaft, and a hybrid pad location adjacent to the fluid film location on the stationary journal bearing. The hybrid pad has a minimum leading edge angular location on the stationary journal bearing of 31.0° and a maximum trailing edge angular location on the stationary journal bearing of 43.0°. The gear pump also includes a porting path for supplying high pressure fluid from a discharge of the gear pump to the fluid film at the hybrid pad.

Another embodiment includes a method for use with a stationary journal bearing. The method includes supporting a drive gear with a stationary journal bearing, a gear shaft passing through the drive gear. The method also includes providing a fluid film at a fluid film location annularly between a surface of the stationary journal bearing and a surface of the gear shaft, and providing a hybrid pad on the stationary journal bearing. The hybrid pad is located to have a minimum leading edge angular location on the stationary journal bearing of 31.0° and a maximum trailing edge angular location on the stationary journal bearing of 43.0°. High pressure fluid is supplied from a discharge of a gear pump to the hybrid pad through a capillary port at an angular location on the stationary journal bearing between the minimum leading edge angular location and the maximum trailing edge angular location, and the fluid film is pressurized with the high pressure fluid supplied to the hybrid pad.

Figure 1:
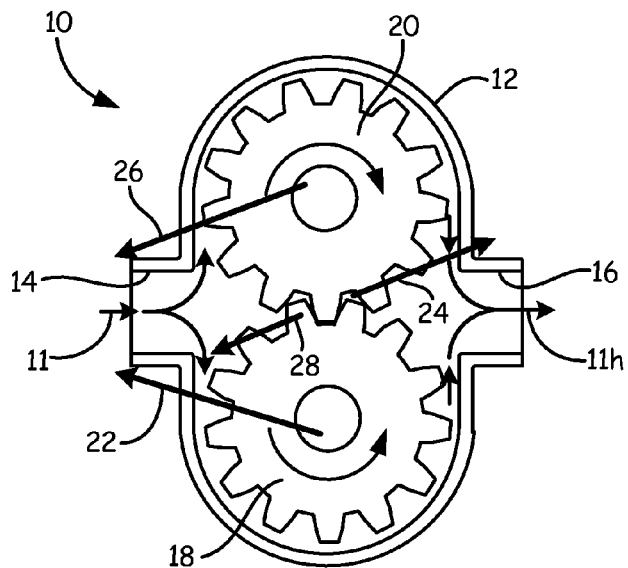
FIG. 1 is a schematic, cross-sectional view of a gear pump showing the approximate direction of loads affecting both drive and driven gears of the gear pump.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Generally, a load carrying capacity of a stationary journal bearing supporting a drive gear can be increased, without increasing a size of the stationary journal bearing, by supplying high pressure fluid from a discharge of a gear pump to a fluid film at a hybrid pad on the stationary journal bearing. The high pressure fluid supplied to the fluid film at the hybrid pad allows the fluid film, and thus the stationary journal bearing, to support an increased load, yet at the same time meet gear pump operating and/or weight requirements. However, a location of the hybrid pad on the stationary journal bearing is critical for successfully increasing load carrying capacity of the stationary journal bearing without compromising gear pump flow requirements.

FIG. 1 is a schematic, cross-sectional view of an embodiment of gear pump 10. Gear pump 10 includes fluid 11, high pressure fluid 11h, gear pump housing 12, gear pump inlet 14 (sometimes referred to as the front of gear pump 10), gear pump outlet 16 (sometimes referred to as the rear of gear pump), drive gear 18, and driven gear 20. Drive gear 18 experiences radial pressure load 22 and power transfer reaction load 24, whereas driven gear 20 experiences radial pressure load 26 and power transfer reaction load 28.

Gear pump 10 can operate to pump fluid 11 at a constant rate from inlet 14 to outlet 16. Fluid 11 enters housing 12 at inlet 14. Using a relatively low supplied inlet pressure, fluid 11 fills into gaps between teeth of drive gear 18 and housing 12, and teeth of driven gear 20 and housing 12. Drive gear 18 is rotated, in a counterclockwise direction in the illustrated embodiment, which in turn rotates driven gear 20, in a clockwise direction in the illustrated embodiment. As gears 18 and 20 turn, fluid 11 is moved toward relatively high pressure outlet 16 and squeezed out from housing 12 as high pressure fluid 11$h$. Fluid 11 (and 11$h$) and fluid film 52 (shown in FIG. 4A) can be, for example, Jet A or Jet A-1 fuel, which is at a temperature of approximately 300° F. (149° C.) when entering inlet 14 of gear pump 10.

For a given gear pump 10, drive gear 18 and driven gear 20 experience different loading. For example, drive gear 18 experiences radial pressure load 22 and power transfer reaction load 24 in the directions shown in FIG. 1. Radial pressure load 22 results from a pressure gradient of fluid 11 (i.e., low pressure at inlet 14 and high pressure at outlet 16), and power transfer reaction load 24 results from resistance of driven gear 20 which is rotated by drive gear 18. Driven gear 20 experiences radial pressure load 26 and power transfer reaction load 28 in the directions shown in FIG. 1. Radial pressure load 26 similarly results from fluid 11 pressure gradient, and power transfer reaction load 28 results from driven gear 20 being pushed by drive gear 18. Because drive gear 18 and driven gear 20 experience different loading, the respective stationary journal bearings which support each gear 18 and 20, via respective gear shafts of each gear 18 and 20, also experience different loading. Therefore, because of the differing loads, increasing the load carrying capacity of the stationary journal bearing is specific to the stationary journal bearing supporting drive gear 18. Thus, the discussion to follow will specifically address the stationary journal bearing which supports drive gear 18.

Figure 2:
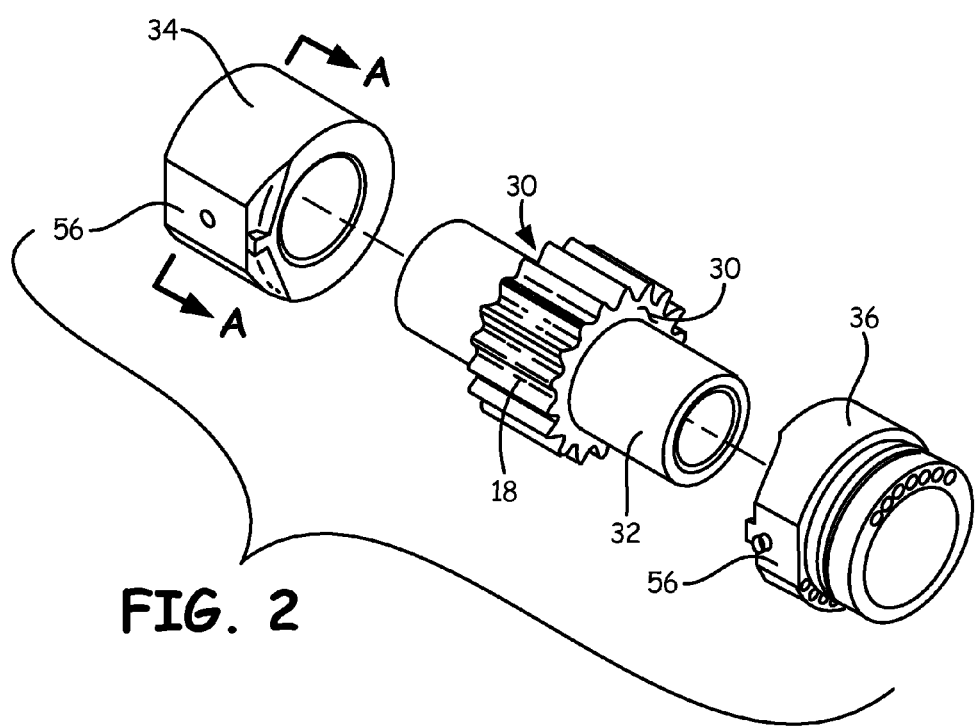
FIG. 2 is an exploded perspective view of a drive gear and bearing set of a gear pump.

FIG. 2 is an exploded, perspective view of drive gear 18 of FIG. 1. Drive gear 18 has axially opposed gear faces 30 and is supported within gear pump 10 (shown in FIG. 1) by gear shaft 32, which passes through drive gear 18. Gear shaft 32 is in turn supported by both stationary journal bearing 34 and pressure loaded journal bearing 36. Stationary journal bearing 34 is fixed in place, for example against housing 12 (shown in FIG. 1), whereas pressure loaded journal bearing 36 can translate axially relative to gear shaft 32. The loads experienced by drive gear 18, as shown in FIG. 1, are transferred to gear shaft 32. Therefore, stationary journal bearing 34 and pressure loaded journal bearing 36 support gear shaft 32, and thus drive gear 18, by reacting the loads from gear shaft 32. Each bearing 34 and 36 carries the loads from gear shaft 32 through a fluid film located between a surface of bearing 34 (as well as bearing 36) and a surface of gear shaft 32, as will be discussed below. FIG. 2 also shows bearing flat 56, from which angular locations of various internal and external features can be measured.

Figure 3A:
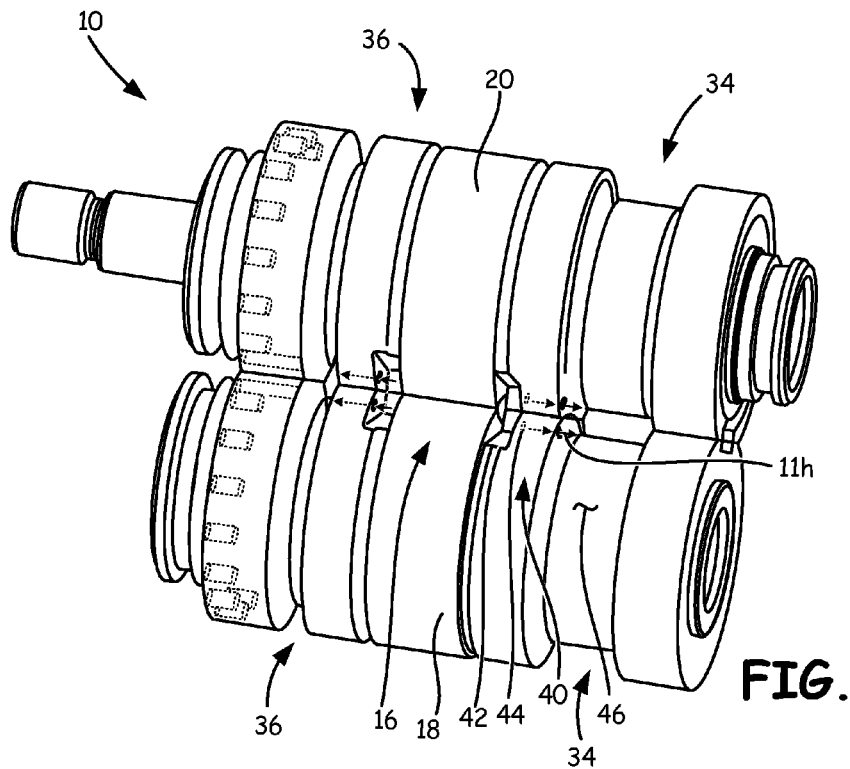
FIG. 3A is a schematic, rear perspective view of a gear pump illustrating a first portion of a porting path.
Figure 3B:
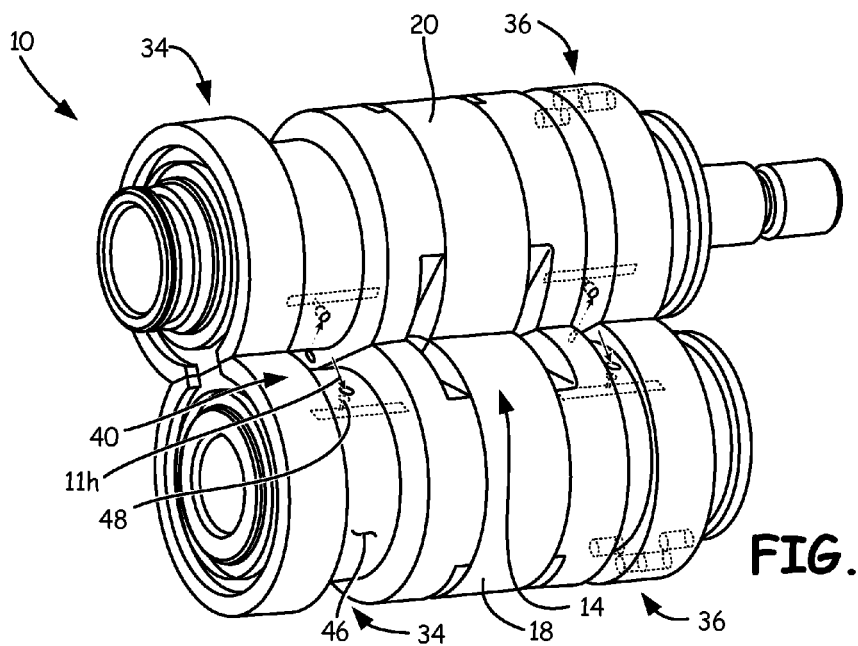
FIG. 3B is a schematic, front perspective view of the gear pump illustrating a second portion of the porting path of FIG. 3A.
Figure 4A:
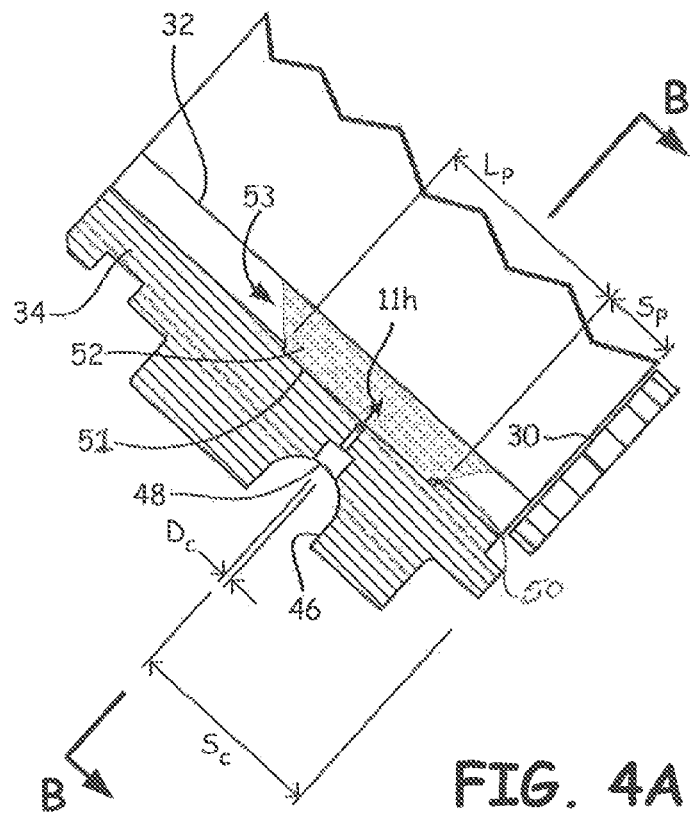
FIG. 4A is a cross-sectional view of a stationary journal bearing taken along line A-A of FIG. 2.
Figure 4B:
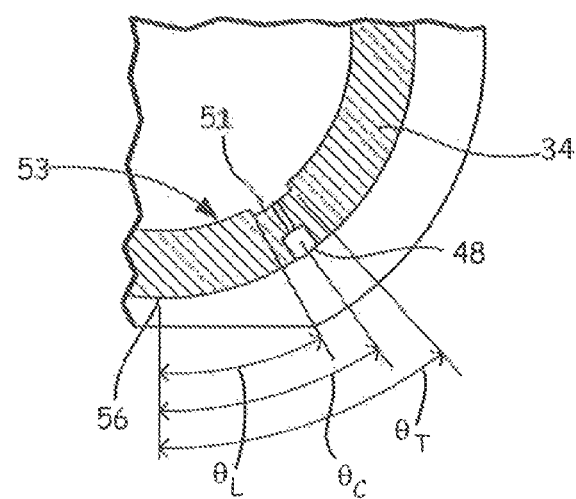
FIG. 4B is another cross-sectional view of the stationary journal bearing taken along line B-B of FIG. 4A.

FIG. 3A is a schematic, rear perspective view of a portion of gear pump 10 illustrating a first portion of porting path 40, while FIG. 3B is a schematic, front perspective view of a portion of gear pump 10 illustrating a second portion of porting path 40 of FIG. 3A. FIGS. 3A and 3B are simplified illustrations which do not specifically show gear teeth. FIG. 4A is a cross-sectional view of stationary journal bearing 34 taken along line A-A of FIG. 2, while FIG. 4B is another cross-sectional view of stationary journal bearing 34, taken along line B-B of FIG. 4A. Included, in addition to that shown and described previously, are porting path 40 (which is made up of discharge face cut 42 on bearing 34, axial hole 44 through bearing 34, radial spool cut 46 on bearing 34, and capillary port 48 (with diameter $D_C$ and axial spacing $S_C$ from gear face 30)), hybrid pad 50 (with axial length $L_P$ and axial spacing $S_P$ from gear face 30), hybrid pad recess 51, fluid film 52, fluid film location 53, hybrid pad recess leading edge angular location $\theta_L$, hybrid pad recess trailing edge angular location $\theta_T$, and capillary port 48 angular location $\theta_C$.

The load carrying capacity of stationary journal bearing 34 is increased by delivering high pressure fluid 11$h$ from outlet 16 to hybrid pad recess 51. Fluid 11$h$ from outlet 16 is supplied through porting path 40, forming hybrid pad 50 around particular angular location(s) proximate or adjacent to fluid film location 53. Specifically, fluid 11$h$ discharges from outlet 16 at discharge face cut 42, and passes through axial hole 44 to radial spool cut 46 as shown in FIG. 3A. Once at radial spool cut 46, fluid 11$h$ then travels circumferentially around radial spool cut 46 and into capillary port 48, as shown in FIG. 3B.

Capillary port 48 extends through stationary journal bearing 34 from radial spool cut 46 to hybrid pad recess 51, as shown in FIGS. 3B, 4A, and 4B. Therefore, when fluid 11$h$ enters into capillary port 48 from radial spool cut 46 it is delivered to a location for hybrid pad 50. In the illustrated embodiment, capillary port 48 has on-center axial spacing $S_C$ of approximately 0.600 inch (1.524 cm) from drive gear face 30 and diameter $D_C$ of approximately 0.023 inch (0.058 cm). However, manufacturing tolerances for diameter $D_C$ can include up to +0.004 inch (0.010 cm). Capillary port 48 can be in fluid connection with hybrid pad 50 at any location along hybrid pad recess 51. For example, capillary port 48 can be centered on hybrid pad recess 51, or as shown in the illustrated embodiment capillary port 48 can be offset from a center of hybrid pad recess 51. Capillary port 48, as shown, is offset from a center of hybrid pad 50 and hybrid pad recess 51 because capillary port 48 can be located at or near where capillary port 48 is most cost-effective to machine given a geometry of bearing 34.

Hybrid pad recess 51 is at a location where high pressure fluid 11$h$ is injected to supplement fluid film 52, as shown in FIG. 4A. In the illustrated embodiment, hybrid pad 50 and recess 51 each have axial length $L_P$ of approximately 0.675 inch (1.71 cm) and have axial spacing $S_P$ of approximately 0.30 inch (0.76 cm) from drive gear face 30, as measured from an edge of hybrid pad 50 and/or recess 51 closest to gear face 30. However, manufacturing tolerances for axial length $L_P$ and axial spacing $S_P$ can include ±0.01 inch (0.025 cm). A configuration of hybrid pad 50 on bearing 34 is critical to successfully achieve increased load carrying capacity of bearing 34. Angular locations are referenced relative to a center of bearing flat 56 (i.e. zero degrees), in the direction of rotation (i.e. towards inlet 14, away from outlet 16). Angular location referencing will be further shown and described for FIG. 5. Hybrid pad 50 and recess 51 are located on bearing 34 at a location such that a minimum leading edge of hybrid pad 50 and recess 51 each have angular location $\theta_{Lmin}$ of 31.0°, and a maximum trailing edge of hybrid pad 50 and recess 51 each have angular location $\theta_{Tmax}$ of 43.0° (i.e., all of hybrid pad 50 and all of recess 51 is axially within an angular location range of 31.0°-43.0°, but need not extend fully within this range). In one embodiment as shown in FIG. 4B, hybrid pad 50 and recess 51 each extends fully within the angular location range of 31.0°-43.0°, such that $\theta_{Lmin}$ is equal to $\theta_L$ and $\theta_{Tmax}$ is equal to $\theta_T$. In other embodiments, hybrid pad 50 and recess 51 each can have a leading edge angular location $\theta_L$ of 32°, and a trailing edge angular location $\theta_T$ of 42°. In yet further embodiments, hybrid pad 50 and recess 51 each can have a leading edge angular location $\theta_L$ of 34°, and a trailing edge angular location $\theta_T$ of 40°. As shown, hybrid pad 50 and recess 51 are centered at angular location $\theta_P$ of 37° (shown in FIG. 5). More generally, to provide suitable film augmentation with maximum acceptable leakage in gear pump applications, other embodiments can have an overall hybrid pad recess 51 width of about 8°-12°, and/or hybrid pad 50 can be centered at locations other than 37° as long as all of hybrid pad 50 and/or recess 51 is axially within the angular location range of 31.0°-43.0°. With hybrid pad recess 51 in an angular location range of 31.0°-43.0°, capillary port 48 has angular location $\theta_C$ on bearing 34 of approximately 37.0°, as measured from a centerline of bearing flat 56.

Fluid film 52, as shown in FIG. 4A, is located between a surface of stationary journal bearing 34 and a surface of gear shaft 32. Fluid 11 is used to create fluid film 52, because fluid 11 is axially drawn to location 53 shown in FIG. 4A as gear pump 10 begins to operate. Bearing 34 supports gear shaft 32 by reacting loads applied by gear shaft 32 through fluid film 52. By injecting high pressure fluid 11h into fluid film 52 at hybrid pad 50, the pressure of fluid film 52 is increased compared to a pressure of fluid film 52 as gear pump 10 begins to operate, and therefore, the load carrying capacity of bearing 34 is increased. In the illustrated embodiment, pressurizing fluid film 52 with high pressure fluid 11h increases a thickness of fluid film 52 by approximately 0.000012 inch (0.000030 cm), and as a result, bearing 34 can carry greater loads without risk of a bearing touchdown.

Figure 5:
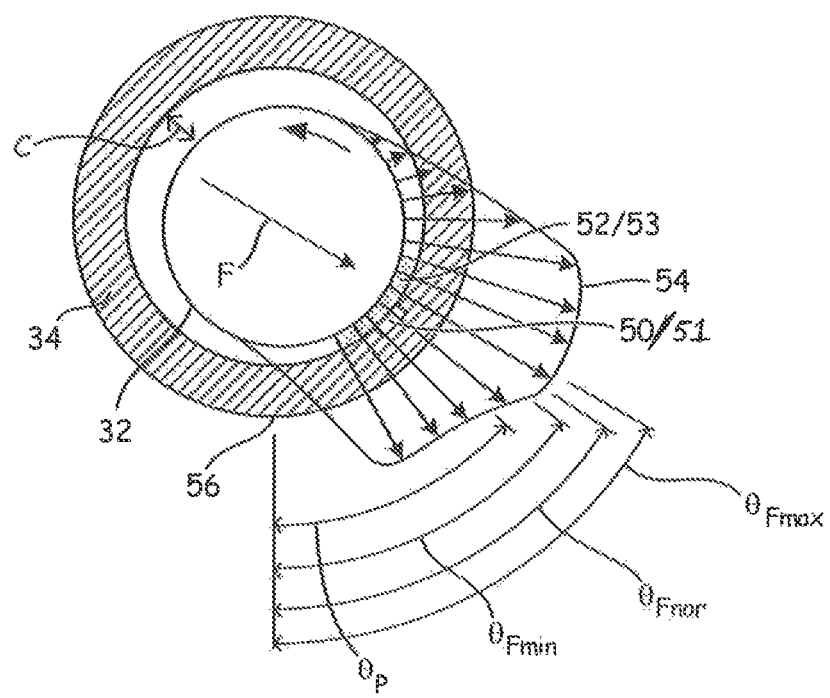
FIG. 5 is schematic diagram showing a pressure distribution profile of a stationary journal bearing which includes a hybrid pad.

FIG. 5 is a schematic diagram showing bearing pressure distribution profile 54 when hybrid pad 50 is properly configured at recess 51. Included, in addition to that shown and described previously, are bearing pressure distribution profile 54, bearing flat 56, maximum diametral clearance C between a surface of bearing 34 and a surface of gear shaft 32, hybrid pad center angular location $\theta_P$, maximum radial load F, load F maximum angular location $\theta_{Fmax}$, load F minimum angular location $\theta_{Fmin}$, and load F normalized angular location $\theta_{Fnor}$. Angular locations are measured from bearing flat 56 in the direction of rotation (i.e., towards inlet 14, away from outlet 16). The direction of rotation with respect to bearing 34 is clockwise from flat 56. Load F represents a summation of loads acting on drive gear 18 (e.g., loads 22 and 24 as shown and described for FIG. 1). Maximum radial load F can range in location from load F maximum angular location $\theta_{Fmax}$ to load F minimum angular location $\theta_{Fmin}$. Angular location $\theta_{Fnor}$ is a normalized location for the range of angles at which load F can act.

FIG. 5 shows bearing pressure distribution profile 54 of bearing 34. Gear shaft 32 rotates within bearing 34 at a speed of approximately 8215 RPM. Maximum diametral clearance C between a surface of bearing 34 and a surface of gear shaft 32 as illustrated is approximately 0.0039 inch (0.00991 cm). In the illustrated embodiment, load F can be applied by gear shaft 32 at angular locations ranging from $\theta_{Fmin}$ of approximately 43.4° to $\theta_{Fmax}$ of approximately 52.1°, with load F having normalized angular location $\theta_{Fnor}$ of 47.4°. Maximum load F is approximately 532 lb/in² (3668 kPa) in magnitude and represents the highest magnitude loading to be experienced by bearing 34 in the particular gear pump 10 application. By properly configuring hybrid pad 50 at recess 51 and injecting high pressure fluid 11h into fluid film 52 at hybrid pad 50, maximum load F can be carried by bearing 34 through fluid film 52 without risk of bearing 34 failure (i.e., a bearing touchdown).

However, as noted previously, an increased load carrying capacity of bearing 34 can only result if hybrid pad 50 is properly configured at recess 51. The proper configuration of hybrid pad 50 and recess 51 is a function of a plurality of factors, which can include, for example, a rotational speed of gear shaft 32, a magnitude and angle of gear shaft 32 radial load F, maximum diametral clearance C between a surface of bearing 34 and a surface of gear shaft 32, geometry of gear shaft 32 and bearing 34 or 36, and fluid film 52 properties (e.g., density, viscosity, specific heat). An improperly configured hybrid pad 50 can vent fluid film 52 pressure, instead of adding to fluid film 52 pressure, resulting in a decrease in load carrying capability of bearing 34. Also, an improperly configured hybrid pad 50 can result in excessive gear pump 10 leakage, preventing gear pump 10 from meeting flow requirements.

Figure 6:
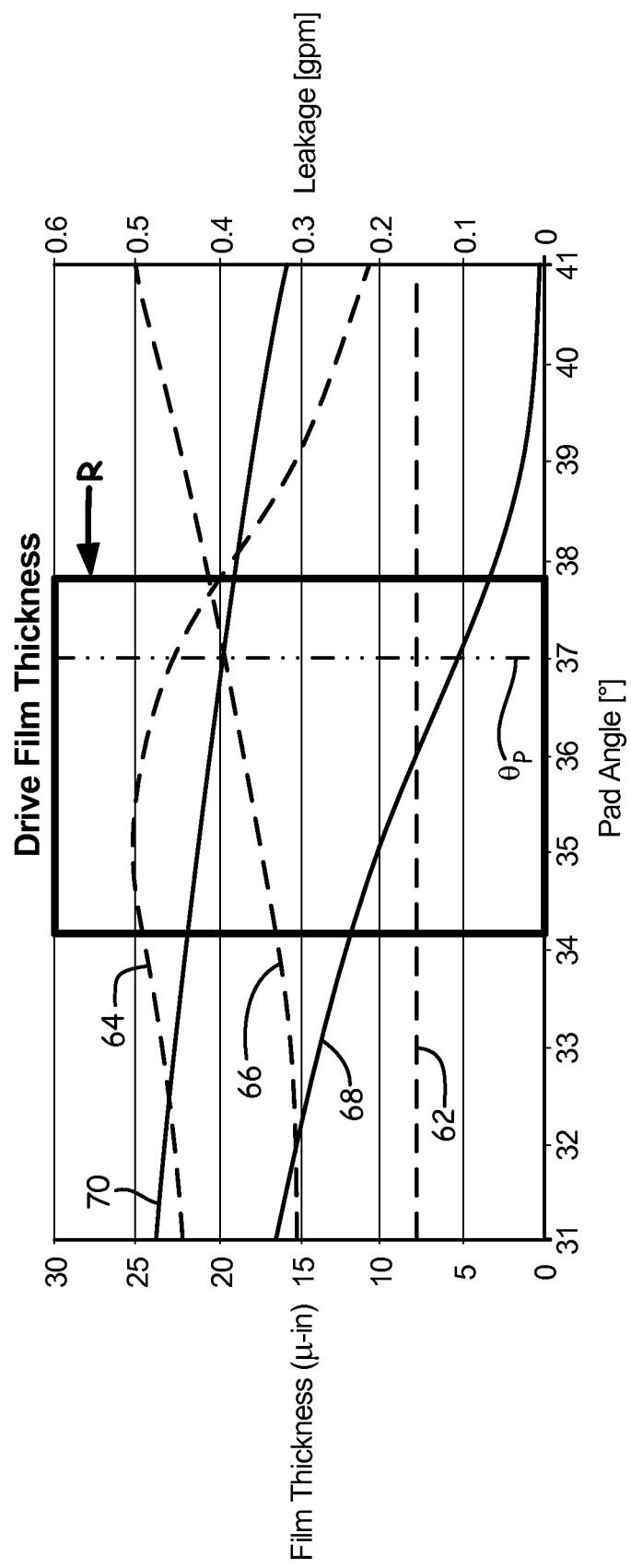
FIG. 6 is graph illustrating fluid film performance as a function of hybrid pad configuration.

FIG. 6 graphically illustrates both fluid film 52 performance, and leakage of gear pump 10, as a function of hybrid pad 50 configuration. FIG. 6 data reflects maximum load F (shown in FIG. 5) of approximately 532 lb/in² (3668 kPa) (i.e., the maximum, most challenging loading scenario for bearing 34 under the given gear pump 10 application). Load F minimum angular location $\theta_{Fmin}$ is approximately 43.4°, and load F maximum angular location $\theta_{Fmax}$ is approximately 52.1°. A horizontal axis indicates hybrid pad 50 angular locations, as measured to a center of hybrid pad 50 from bearing flat 56 (in a direction of rotation, i.e. toward inlet 14 and away from outlet 16). Included on the horizontal axis is chosen hybrid pad center angular location $\theta_P$ (hybrid pad 50 is centered at an angular location of 37°), as well as region R which represents a range of hybrid pad 50 center angular location $\theta_P$ based on manufacturing tolerances (with all of hybrid pad 50 axially within an angular location range of 31.0°-43.0°, as discussed previously). Region R encompasses hybrid pad 50 center angular locations $\theta_P$ of approximately 34.3° to approximately 37.6°. A left vertical axis indicates a thickness of fluid film 52 versus hybrid pad 50 angular location, given by dashed plot lines. Thickness of fluid film dashed plot lines include plot 62 where no hybrid pad 50 is used on bearing 34, plot 64 where hybrid pad 50 is used and load F is at a minimum load angular location $\theta_{Fmin}$, and plot 66 where hybrid pad 50 is used and load F is at a maximum load angular location $\theta_{Fmax}$.

Plot 62 (no hybrid pad) shows a thickness of fluid film 52 is approximately 7.4 microinches (0.188 μm) at all angular positions of load F. When hybrid pad 50 is configured on bearing 34 at angular location $\theta_P$ (37°), plot 64 (minimum load angle) shows a thickness of fluid film 52 at $\theta_P$ of approximately 22.5 microinches (0.571 μm), while plot 66 (maximum load angle) shows a thickness of fluid film 52 at $\theta_P$ of approximately 19.2 microinches (49.8 μm). Therefore, by pressurizing fluid film 52 with high pressure fluid 11h at hybrid pad 50 configured at angular location $\theta_P$ of about 37°, bearing 34 not only has a thicker fluid film 52 and thus can carry a greater load as compared to bearing 34 without hybrid pad 50 (plot 62), but can also maintain fluid film 52 at a thickness great enough to support maximum load F over a range of angles of load F. Furthermore, designing gear pump 10 such that hybrid pad 50 is located at or about angular location $\theta_P$ of about 37° allows for manufacturing tolerances within region R which still permit bearing 34 to perform over a range on angles of maximum load F because $\theta_P$ is near a maximum thickness of fluid film 52, yet eliminates a risk of manufacturing tolerances leading to a location of hybrid pad 50 where the thickness of fluid film 52 significantly decreases. The present inventors have discovered that at all other hybrid pad 50 angular locations less than angular location $\theta_P$ of about 37°, thickness of fluid film 52 decreases, and thus so does bearing 34 load carrying capacity (and the ability to accommodate manufacturing tolerances). Furthermore, altering hybrid pad 50 angular location $\theta_P$ by more than a couple degrees greater than about 37° causes a decrease in thickness of fluid film 52 for plot 64 (minimum load angle). Thus, varying hybrid pad 50 configuration forward or backward by even a few angular degrees significantly alters the thickness of fluid film 52 over the range of angles of load F, and thus ultimately the ability of bearing 34 to prevent a bearing touchdown under all load ranges. Hybrid pad 50 angular location $\theta_P$ of about 37° strikes a balance between allowing bearing 34 to support maximum load F over the various angular locations of maximum load F, while still taking into account manufacturing tolerances in region R when locating hybrid pad 50.

A right vertical axis of FIG. 6 indicates leakage of gear pump 10 at the various hybrid pad 50 angular locations on the horizontal axis, given by solid plot lines. Leakage of gear pump 10 represents a loss of flow capacity of gear pump 10 due to some of fluid 11h from discharge 16 being diverted from one or more destinations and instead delivered to hybrid pad 50. Thus, when no hybrid pad 50 is used, leakage of gear pump 10 is zero. Leakage of gear pump 10 solid plot lines include plot 68 where hybrid pad 50 is used and load F is at a minimum load angular location $\theta_{Fmin}$, and plot 70 where hybrid pad 50 is used and load F is at a maximum load angular location $\theta_{Fmax}$. As can be seen, hybrid pad 50 configuration also significantly affects gear pump 10 leakage. When hybrid pad 50 is configured at angular location $\theta_P$ (37°), plot 68 (minimum load angle) shows gear pump 10 leakage is approximately 0.12 gpm (0.45 l/min) at $\theta_P$, while plot 70 (maximum load angle) shows gear pump 10 leakage is approximately 0.39 gpm (1.48 l/min) at $\theta_P$. Therefore, by configuring hybrid pad 50 at or about angular location $\theta_P$ of 37° gear pump 10 leakage is kept at an acceptable rate over the range of load F angles, which can allow gear pump 10 to meet flow requirements under the various loads without compromising fluid film 52 thickness and thus load carrying capacity of bearing 34 over the range of load F angles. Although altering hybrid pad 50 configuration forward by a few angular degrees can decrease gear pump 10 leakage, this configuration will also excessively vent fluid film 52 pressure for plot 64, decreasing fluid film 52 thickness, and reduce bearing 34 load carrying capacity for at least some angular ranges of load F. On the other hand, altering hybrid pad 50 configuration backward by a few angular degrees can result in excessive leakage of gear pump 10 and prevent gear pump 10 from meeting flow requirements (to desired destinations).

Consequently, by properly configuring hybrid pad 50 and delivering high pressure fluid 11h to fluid film 52 at hybrid pad 50, the load carrying capacity of bearing 34 can be increased, without obstructing gear pump 10 from meeting flow requirements, such that a risk of a bearing touchdown is eliminated or substantially eliminated. Yet, bearing 34 size and/or weight is not increased, and as a result gear pump 10 can be utilized in applications with operating and/or weight requirements.

Discussion of Possible Embodiments

The following are non-exclusive descriptions of possible embodiments of the present invention.

A gear pump comprising a drive gear; a gear shaft passing through the drive gear; a stationary journal bearing; a fluid film location annularly between a surface of the stationary journal bearing and a surface of the gear shaft; a hybrid pad location on the stationary journal bearing adjacent to the fluid film location with a minimum leading edge angular location on the stationary journal bearing of 31.0° and a maximum trailing edge angular location on the stationary journal bearing of 43.0°; and a porting path for supplying high pressure fluid from a discharge of the gear pump to the fluid film at the hybrid pad.

The gear pump of the preceding paragraph can optionally include, additionally and/or alternatively, any one or more of the following features, configurations and/or additional components:

A further embodiment of the foregoing gear pump, wherein the hybrid pad is axially spaced approximately 0.30 inch (0.76 cm) from a face of the drive gear, and wherein the hybrid pad has an axial length of approximately 0.675 inch (1.71 cm).

A further embodiment of any of the foregoing gear pumps, wherein the fluid film supports a radial load of up to approximately 532 lb$_f$/in$^2$ (3668 kPa) at or near the hybrid pad.

A further embodiment of any of the foregoing gear pumps, wherein the radial load is at an angular location of approximately 47.4°.

A further embodiment of any of the foregoing gear pumps, wherein a maximum diametral clearance between the surface of the stationary journal bearing and the surface of the gear shaft is approximately 0.0039 inch (0.00991 cm).

A further embodiment of any of the foregoing gear pumps, wherein the high pressure fluid from the discharge of the gear pump is Jet A-1 fluid, and wherein the fluid is approximately 300° F. (149° C.) when entering the gear pump.

A further embodiment of any of the foregoing gear pumps, wherein the porting path comprises a discharge face cut on the stationary journal bearing for receiving the high pressure fluid from the discharge of the gear pump; a radial spool cut on the stationary journal bearing; an axial hole through the stationary journal bearing for communicating the high pressure fluid from the discharge face cut to the radial spool cut; and a capillary port extending through the stationary journal bearing from the radial spool cut to the hybrid pad location for delivering the high pressure fluid from the radial spool cut to the hybrid pad location.

A further embodiment of any of the foregoing gear pumps, wherein a centerline of the capillary port is axially spaced approximately 0.600 inch (1.524 cm) from a face of the drive gear.

A further embodiment of any of the foregoing gear pumps, wherein the capillary port has an angular location on the stationary journal bearing of approximately 37°.

A further embodiment of any of the foregoing gear pumps, wherein the capillary port has a diameter of approximately 0.023 inch (0.058 cm).

A method for use with a stationary journal bearing, the method comprising supporting a drive gear with a stationary journal bearing, wherein a gear shaft passes through the drive gear; providing a fluid film at a fluid film location between a surface of the stationary journal bearing and a surface of the gear shaft; providing a hybrid pad on the stationary journal bearing and locating the hybrid pad adjacent to the fluid film location to have a minimum leading edge angular location on the stationary journal bearing of 31.0° and a maximum trailing edge angular location on the stationary journal bearing of 43.0°; supplying high pressure fluid from a discharge of a gear pump to the hybrid pad through a capillary port at an angular location on the stationary journal bearing between the minimum leading edge angular location and the maximum trailing edge angular location; and pressurizing the fluid film with the high pressure fluid supplied to the hybrid pad.

The method of the preceding paragraph can optionally include, additionally and/or alternatively, the following techniques, steps, features and/or configurations:

A further embodiment of the foregoing method, wherein subjecting the gear shaft to a radial load of up to approximately 532 lb$_f$/in$^2$ (3668 kPa) at an angular location of approximately 47.4°.

A further embodiment of any of the foregoing methods, wherein the hybrid pad is axially positioned approximately 0.30 inch (0.76 cm) from a face of the drive gear.

A further embodiment of any of the foregoing methods, wherein the gear shaft is rotated at a speed of approximately 8215 RPM.

A further embodiment of any of the foregoing methods, wherein pressurizing the fluid film with the high pressure fluid increases a thickness of the fluid film by approximately 0.000012 inch (0.000030 cm).

Any relative terms or terms of degree used herein, such as "generally", "substantially", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gear pump comprising:
a drive gear;
a gear shaft passing through the drive gear;
a stationary journal bearing configured to support the gear shaft during rotation thereof, the gear shaft supported on a fluid film formed annularly between a surface of the stationary journal bearing and a surface of the gear shaft during rotation of the gear shaft;
a hybrid pad recess at a hybrid pad location on the stationary journal bearing adjacent to a fluid film location, the hybrid pad recess with a minimum leading edge angular location on the stationary journal bearing of 31.0° in a direction of drive gear rotation relative to a bearing flat, and a maximum trailing edge angular location on the stationary journal bearing of 43.0° in the direction of drive gear rotation relative to the bearing flat; and a porting path for supplying high pressure fluid from a discharge of the gear pump to the hybrid pad recess, the high pressure fluid supplementing the fluid film during rotation of the gear shaft;
wherein the porting path comprises:
a discharge face cut on the stationary journal bearing for receiving the high pressure fluid from the discharge of the gear pump;
a radial spool cut on the stationary journal bearing;
an axial hole through the stationary journal bearing for communicating the high pressure fluid from the discharge face cut to the radial spool cut; and
a capillary port extending through the stationary bearing from the radial spool cut to the hybrid pad recess for delivering the high pressure fluid from the radial spool cut to the hybrid pad recess.

2. The gear pump of claim 1, wherein the hybrid pad recess is axially spaced approximately 0.30 inch (0.76 cm) from a face of the drive gear, and wherein the hybrid pad recess has an axial length of approximately 0.675 inch (1.71 cm).

3. The gear pump of claim 1, wherein a maximum diametral clearance between the surface of the stationary journal bearing and the surface of the gear shaft is approximately 0.0039 inch (0.00991 cm) during rotation of the gear shaft.

4. The gear pump of claim 1, wherein a centerline of the capillary port is axially spaced approximately 0.600 inch (1.524 cm) from a face of the drive gear.

5. The gear pump of claim 1, wherein the capillary port has an angular location on the stationary journal bearing of approximately 37°.

6. The gear pump of claim 1, wherein the capillary port has a diameter of approximately 0.023 inch (0.058 cm).

7. A method for operating a gear pump with a stationary journal bearing, the method comprising:
supporting a drive gear with a stationary journal bearing, wherein a gear shaft passes through the drive gear;
providing a fluid film at a fluid film location annularly between a surface of the stationary journal bearing and a surface of the gear shaft;
providing a hybrid pad on the stationary journal bearing and locating the hybrid pad adjacent to the fluid film location to have a minimum leading edge angular location on the stationary journal bearing of 31.0° and a maximum trailing edge angular location on the stationary journal bearing of 43.0°;
supplying high pressure fluid through a porting path from a discharge of a gear pump to the hybrid pad through a capillary port at an angular location on the stationary journal bearing between the minimum leading edge angular location and the maximum trailing edge angular location; and
pressurizing the fluid film with the high pressure fluid supplied to the hybrid pad;
wherein the porting path comprises:
a discharge face cut on the stationary journal bearing for receiving the high pressure fluid from the discharge of the gear pump;
a radial spool cut on the stationary journal bearing;
an axial hole through the stationary journal bearing for communicating the high pressure fluid from the discharge face cut to the radial spool cut; and
the capillary port extending through the stationary journal bearing from the radial spool cut to a hybrid pad recess for delivering the high pressure fluid from the radial spool cut to the hybrid pad recess.

8. The method of claim 7, further comprising subjecting the gear shaft to a radial load of up to approximately 532 lbf/in² (3668 kPa) at an angular location of approximately 48.8°.

9. The method of claim 8, wherein pressurizing the fluid film with the high pressure fluid increases a thickness of the fluid film by approximately 0.000012 inch (0.000030 cm).

10. The method of claim 7, wherein the hybrid pad is axially positioned approximately 0.30 inch (0.76 cm) from a face of the drive gear.

11. The method of claim 7, wherein the gear shaft is rotated at a maximum speed of approximately 8215 RPM.

12. The method of claim 7, wherein the fluid film is Jet A-1 fluid, and wherein the fluid film is approximately 300° F. (149° C.) when entering the gear pump.

13. The method of claim 7, wherein a maximum diametral clearance between the surface of the stationary journal bearing and the surface of the gear shaft is approximately 0.0039 inch (0.00991 cm) during rotation of the gear shaft.

* * * * *